United States Patent [19]

Bustin

[11] 4,161,232
[45] Jul. 17, 1979

[54] SAFETY DECK MOUNTING STRUCTURE

[76] Inventor: Leopold Bustin, Emmans Rd., Flanders, N.J. 07836

[21] Appl. No.: 877,970

[22] Filed: Feb. 15, 1978

[51] Int. Cl.² ............................................. B60R 3/00
[52] U.S. Cl. ...................................... 182/92; 182/222
[58] Field of Search ............... 182/119, 82, 92, 222, 182/223; 52/486; 248/250; 108/47; 280/163

[56] References Cited
U.S. PATENT DOCUMENTS

| | | |
|---|---|---|
| 602,125 | 4/1898 | Burrows ............................... 182/119 |
| 3,026,963 | 3/1962 | Wilkie .................................. 182/119 |
| 3,159,242 | 12/1964 | James ..................................... 182/92 |

Primary Examiner—Reinaldo P. Machado
Attorney, Agent, or Firm—Carella, Bain, Gilfillan & Rhodes

[57] ABSTRACT

A safety deck for vehicles, e.g. for use behind a tractor cab or the like, and securing structure therefor is disclosed to utilize J-bolts having resilient members secured to their bases wherein the J-bolts effect securing means of deck structure to the chassis of a vehicle.

7 Claims, 4 Drawing Figures

SAFETY DECK MOUNTING STRUCTURE

BACKGROUND OF THE INVENTION

This invention relates to safety deck structure for vehicles more specifically, this invention relates to a safety deck structure which is mounted on the chassis members of a vehicle through the utilization of a novel and unique mounting structure.

Those familiar with vehicle construction and in particular the utilization of step and deck structure for truck-type vehicles recognize that the securing of said structure to the vehicle can present apparently minor but often difficult to resolve problems.

One generally recognized problem, and the problem to which the present invention is directed, is an acceptable method of mounting deck structure on the structural members of a vehicle either during original assembly of the vehicle or thereafter during modification or repairs.

The usual main structural or chassis members of a truck vehicle comprise a pair of parallel C-shaped channels which run from front to rear. Ordinarily the open side of the C-shaped members face inwardly. To these main structural members are secured and mounted the particular body of the vehicle, auxillary equipment such as gas tanks and the like and, often, deck grating or step structure to permit access of the driver or other person to the space immediately behind the cab or elsewhere as desired. The deck structure has been secured to the chassis either through the use of bolts or by welding. Although welding is a more permanent structural relationship and can be achieved where the metals of the chassis and the gratings are sufficiently similar to permit the welding, it is more difficult, and more expensive, and requires specialized welding equipment as will be recognized by those having skill in these arts. Further, welding any type of decks to truck chassis is undesirable because, inter alia, the chassis structure tends to anneal, welds crack as a result of vibration, and decks which are welded in place are not easily removable for maintenance.

Where the metals of the structures are so dissimilar as to preclude securing by welding and where it is not anticipated that welding equipment will be available, it has generally been recognized that bolting of the structural decks or steps is the desirable mode of securing.

Such bolting has been achieved in either of two ways; a hole is drilled in the structural member to accommodate the bolts, or a clamping type bolt such as a V-bolt has been utilized. Needless to say drilling holes in the structural members of the vehicle is an undesirable approach for the obvious reasons, i.e. it takes time to drill the holes and any holes, such as the bolt holes, tend to weaken the vehicle structure. Thus the operation is undesirable and not recommended by manufactures and unreasonably expensive.

The use of V-bolts has been found to be undesirable because of the particular structural configuration presented by the C-shaped channels. More specifically, based upon the size of the truck, the flange thickness of the structure member of the vehicle may vary from ¼ to ¾ of an inch. Where the flange thickness of the structural member is ⅛ of an inch the problem is not a major one because the flange element fits comfortably into the root of the V-bolt. Where, however, thicker structural flanges form the basis for supporting a deck structure, the thickness of the structural flange tends to create an opening moment on the clamping portion of the V-bolt. This opening moment experienced during both installation and operation, tends to cause the root portion of the bolt to be deformed and open thereby permitting the deck or step structure to become loose on the chassis. Obviously, such is not a desirable condition.

Approaches to solving this problem have for the most part been limited to providing V-bolts with a plurality of root dimensions in order to specifically accommodate the thickness of the particular flange dimension of the structural member of the chassis with respect to which the bolt is to be used. This of course requires an inventory of bolts, is thus expensive and often results in an incorrect bolt being utilized with respect to a particular structural member by reason of mechanic's error or the like.

SUMMARY OF THE INVENTION

It is an object of the present invention, therefore, to provide a mounting structure in association with a structural grating or plate platform which may be utilized for mounting the structure on a plurality of different sized support members.

A further object of the present invention is to provide a mounting structure in association with a structural member such as a deck grating or plate platform which precludes sliding or other relative movement of the structure with respect to support members upon which it is to be mounted.

A still further object of the present invention is to provide a mounting structure for a deck grating or plate platform which permits secure mounting of the structure without the necessity for welding or the like.

Yet another object of the present invention is to provide a mounting structure for deck gratings and the like which is economical to manufacture and simple to install.

These objects and others not enumerated are achieved by the structure of the present invention, one embodiment of which may include a deck structure, means for securing the deck structure to the frame of a vehicle comprising at least one tapped element secured to the deck structure and a J-bolt threadedly engaging the tapped element wherein the J-bolt has a base, a first arm and a second arm, and means disposed on the J-bolt for resiliently engaging the chassis of the vehicle to effect resilient but secure relationship therewith.

BRIEF DESCRIPTION OF THE DRAWINGS

A more complete understanding of the present invention may be had from the following detailed description thereof, particularly when read in the light of the accompanying drawings, wherein.

DETAILED DESCRIPTION OF THE DRAWINGS

Figure 1:
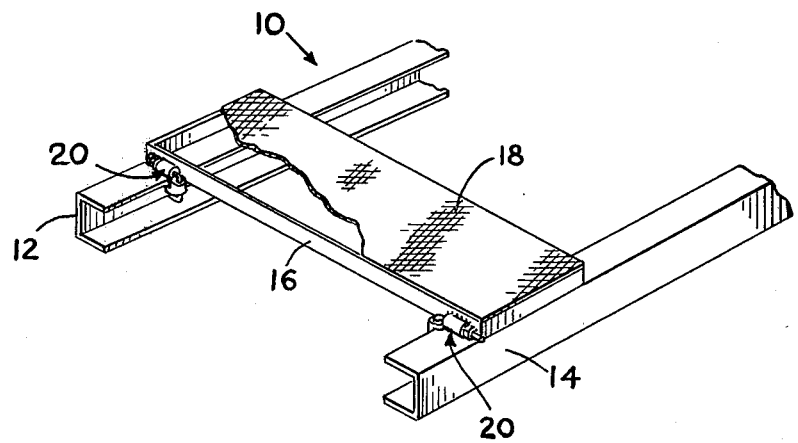
FIG. 1 is a perspective view of a deck grating as secured to the structural members of a vehicle wherein the grating or plate platform and securing structure are in accordance with the teachings of the present invention.

The present invention relates to deck gratings and the like for vehicles and for mounting structure for use therewith. Thus, referring to FIG. 1, a deck grating with securing means structured in accordance with the present invention is shown mounted on the chassis members of a vehicle and designated generally by the reference numeral 10.

Deck structure 10 is mounted on a pair of opposed parallel C-shaped channels 12 and 14 which are typical chassis structural members found in the motor vehicle industry.

Deck grating 10 comprises a generally rectangular frame element 16 and in internal grating section 18 which may be of any of the many ordinarily known in these arts. It should be noted that for purposes of clarity only a portion of grating section 18 has been shown.

Rigidly secured adjacent the respective ends of the transversely extending frame elements are securing structures 20 according to the present invention.

Figure 2:
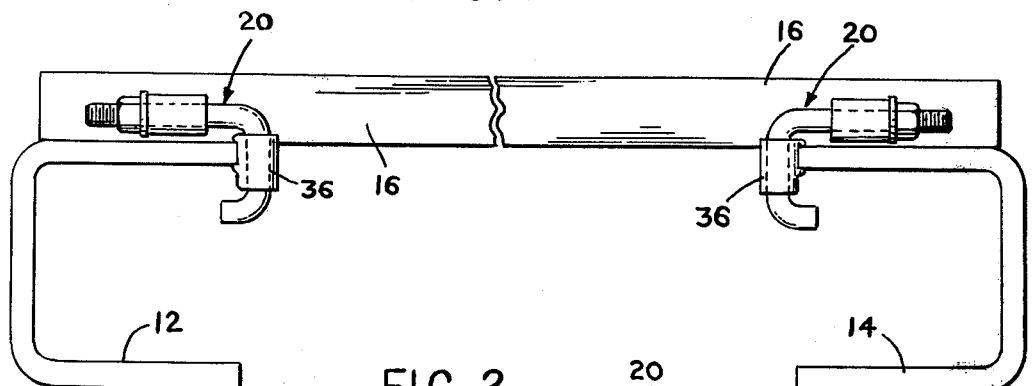
FIG. 2 is a side elevational view of the grating and securing structure utilized in FIG. 1.

As best may be seen in FIG. 2, the securing structures include J-bolts, sleeves on the J-bolts, a washer, a nut and a cylinder which is rigidly secured to the frame members whereby the J-bolts may be tightly secured both as to the frame 16 and as to the respective C-shaped channels 12 and 14. In this regard the drawings show a securing structure 20 engaging channel 12 and a securing structure engaging channel 14. It will be recognized by those having skills in these arts, however, that corresponding securing structures 20 are also disposed on the opposite transversely extending section of frame 16 so as to provide two securing structures engaging channel 12 and two securing structures engaging channel 14 whereby to clearly firmly secure the deck structure 10 to the channels 12 and 14.

Figure 3:
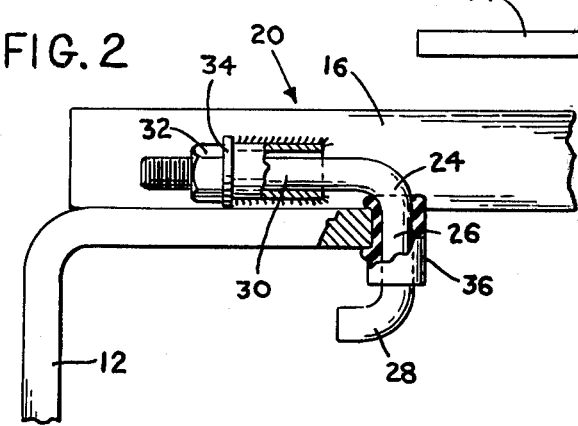
FIG. 3 is a detailed elevational view partly in section, of the securing structure of the present invention.

Referring therefor to FIG. 3 which shows a typical structural configuration for the securing means, the securing means 20 is shown mounted on frame 16 and in engagement with channel 12.

Rigidly secured to frame 16 e.g. by welding or the like is a cylindrical member 22 which may be constructed and secured to the frame as part of the basic construction of the deck structure during initial fabrication.

Extending within cylindrical member 22 is a J-bolt 24 having a base section 26, a short arm 28 and a long arm 30. The long arm 30 extends through cylinder 22 and is provided with threads adjacent its end to accommodate the threaded engagement therewith of a nut 32. A washer 34 may be disposed between the nut 32 and the end of cylindrical member 22 so as to achieve the proper distribution of securing forces.

Disposed around the base 26 of J-bolt 24 is a sleeve 36 which may be of any appropriate resilient material such as rubber, nylon, resilient plastic or the like. Sleeve 36 may be slit longitudinally from end to end to permit mounting on the base section 26, or if the material is sufficiently flexible, the sleeve may be installed on the J-bolt by sliding over the end 28.

As best may be seen in FIG. 3, the length of the base section 26 is significantly greater than the thickness of the flange of channel 12. Thus, the single J-bolt 24 may be utilized with respect to structural members whose flanges are of varying thickness up to the full dimension of the base section 26. Clearly this gives a degree of flexibility which is not otherwise available in the prior art as discussed above.

Further, the resilient sleeve 36 causes a positive engagement between the securing structure and the edge of the flange of channel 12 thus precluding relative movement between the channel and the J-bolt when the full securing is made.

In this regard it can be seen that as nut 32 is threaded onto arm 30 of J-bolt 24 and caused to come into engagement with the surface of washer 34 so as to create a load, compressive forces are introduced into frame 16 as well as into the flange of channel 12 thereby effecting a rigid securing between the two members.

Figure 4:
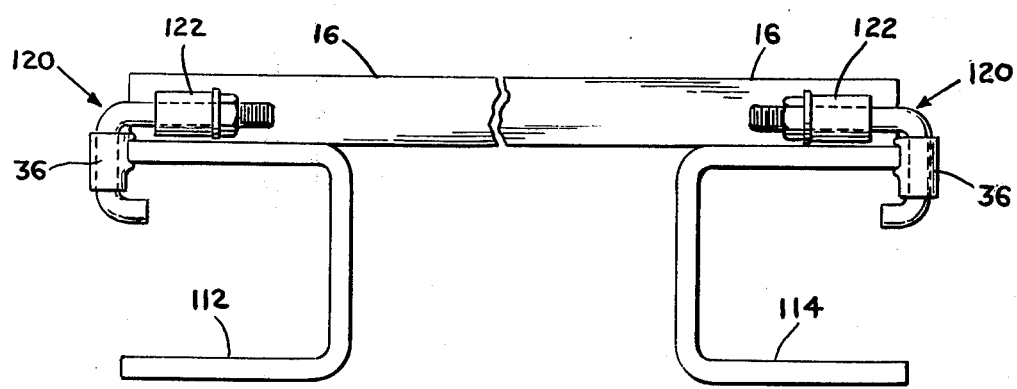
FIG. 4 is a view similar to FIG. 2 but showing the securing structure of the present invention as utilized with outwardly opening structural members.

With reference to FIG. 4, there is shown a structural relationship wherein the C-shaped channels 112 and 114 face outwardly rather than inwardly as in the embodiment of FIGS. 1-3. When the structure of the present invention is to be utilized in such a situation, there is no need to modify any of the structural members, rather it is only necessary to reverse the direction of the bolts so as to be shown in the positions of bolts 120 in FIG. 4. The structure is substantially identical, only the bolt direction of insertion through the cylindrical elements 122 is reversed and the securing effect is the same. However, in the embodiment shown in FIG. 4 tightening of the securing structure causes a tension to be created in frame 16 rather than a compression although compressive forces are generated in the flanges of C-shaped structural elements 112 and 114.

The foregoing detailed description of this improvement is directed to what otherwise appears to be a relatively simple structural relationship. However, the structures presently utilized in these arts clearly indicate that it is a novel approach to the problem of securing structures such as deck gratings or plate platforms. Certainly, the structure of the present invention is inexpensive and even more certainly it is more reliable. Further the use of the sleeves between the J-bolts and the chassis flanges reduces the likelihood of the occurrence of electrolytic corrosion resulting from the reaction of dissimilar metals, and absorbs vibration at these points thus improving the quality and reliance of the structure.

It will be recognized that various modifications may be made to the embodiment disclosed as being the preferred embodiment without departing from the spirit and the scope of the invention.

What is claimed is:

1. Safety deck for vehicles comprising:
   a deck structure including a frame element and a grating section;
   means for securing said deck structure to the frame of a vehicle, said frame including at least a pair of support structural elements, said means for securing said deck structure comprising at least two cylindrical elements secured outside said frame element whereby said frame element is adapted to be received on said support element, each of said cylindrical elements for receiving a J-bolt therethrough, at least one J-bolt for engaging one of said support structural elements of said frame, another of said J-bolts for engaging another of said support structural elements of said frame;
   each of said J-bolts including a base, a short arm and a long arm, said long arm being provided with threads and sized to extend through said cylindrical element;

nut means for threadedly engaging said long arm of said J-bolts, said nut means being of a diameter larger than said cylindrical elements such as to be precluded from passing therethrough;

said J-bolts being disposed through said cylindrical elements such as to be positioned in opposing configuration whereby positioning of the basis of said J-bolts on said support structural elements and tightening said nut means creates opposing forces in said frame element; and means disposed on each said J-bolt for resiliently engaging said support structural elements.

2. Apparatus according to claim 1 wherein said J-bolts are configured such that tightening said nut means creates tensile forces in said frame element.

3. Apparatus according to claim 1 wherein said J-bolts are configured such that tightening said nut means creates compressive forces in 4. Apparatus according to claim 1 wherein said means disposed on said J-bolt for resiliently engaging said chassis comprises a sleeve disposed on said base of said J-bolt.

5. Apparatus according to claim 4 wherein said sleeve is manufactured of a resilient material.

6. Apparatus according to claim 5 wherein said sleeve is rubber.

7. Apparatus according to claim 5 wherein said sleeve is nylon.

* * * * *

UNITED STATES PATENT OFFICE
CERTIFICATE OF CORRECTION

Patent No. 4,161,232　　　　　　　　　Dated July 17, 1979

Inventor(s) LEOPOLD BUSTIN

It is certified that error appears in the above-identified patent and that said Letters Patent are hereby corrected as shown below:

In Claim 3, column 6, line 6, after the word "in" insert --said frame element.--

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*